United States Patent
Hanao

(10) Patent No.: US 10,315,245 B2
(45) Date of Patent: Jun. 11, 2019

(54) MOLD FLUX FOR CONTINUOUS-CASTING STEEL

(71) Applicant: NIPPON STEEL & SUMITOMO METAL CORPORATION, Tokyo (JP)

(72) Inventor: Masahito Hanao, Kashima (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 120 days.

(21) Appl. No.: 15/509,207

(22) PCT Filed: Sep. 11, 2014

(86) PCT No.: PCT/JP2014/074130
§ 371 (c)(1),
(2) Date: Mar. 7, 2017

(87) PCT Pub. No.: WO2016/038725
PCT Pub. Date: Mar. 17, 2016

(65) Prior Publication Data
US 2017/0266718 A1  Sep. 21, 2017

(51) Int. Cl.
*B22D 11/00* (2006.01)
*C03C 10/00* (2006.01)
(Continued)

(52) U.S. Cl.
CPC .......... *B22D 11/108* (2013.01); *B22D 11/001* (2013.01); *B22D 11/049* (2013.01);
(Continued)

(58) Field of Classification Search
CPC ... B22D 11/108; B22D 11/001; B22D 11/111; C03C 10/00; C03C 2204/00
(Continued)

(56) References Cited

U.S. PATENT DOCUMENTS

| 2011/0005705 A1* | 1/2011 | Hanao | ............. | B22D 11/001 |
| | | | | 164/485 |
| 2011/0094703 A1* | 4/2011 | Miyake | ............. | B22D 11/111 |
| | | | | 164/468 |

FOREIGN PATENT DOCUMENTS

| CN | 103639384 A | * | 3/2014 |
| JP | 07-185755 | | 7/1995 |

(Continued)

OTHER PUBLICATIONS

CN-103639384-A machine translation and abstract. (Year: 2014).*
(Continued)

*Primary Examiner* — Tima M McGuthry-Banks
(74) *Attorney, Agent, or Firm* — Clark & Brody

(57) ABSTRACT

Provided is mold flux that can prevent longitudinal cracks from forming on a surface of a slab upon continuous-casting hypo-peritectic steel, wherein CaO, $SiO_2$, an alkali metal oxide and a fluorine compound are contained, $1.1 \leq (CaO)_h/(SiO_2)_h \leq 1.9$, $0.10 \leq (CaF_2)_h/((CaO)_h+(SiO_2)_h+(CaF_2)_h) \leq 0.40$ and $0 \leq$ (alkali metal fluoride)$_h/((CaO)_h+(SiO_2)_h+$(alkali metal fluoride)$_h) \leq 0.10$ are satisfied, a solidification temperature is no less than 1300° C., and viscosity at 1450° C. is no more than 0.1 Pa·s.

2 Claims, 1 Drawing Sheet

(51) Int. Cl.

| | |
|---|---|
| B22D 11/108 | (2006.01) |
| B22D 11/111 | (2006.01) |
| C22C 38/00 | (2006.01) |
| C22C 38/02 | (2006.01) |
| C22C 38/04 | (2006.01) |
| C22C 38/06 | (2006.01) |
| C22C 38/12 | (2006.01) |
| C22C 38/14 | (2006.01) |
| B22D 11/049 | (2006.01) |

(52) U.S. Cl.
CPC ............ *B22D 11/111* (2013.01); *C03C 10/00* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C03C 2204/00* (2013.01)

(58) Field of Classification Search
USPC .......................................................... 75/305
See application file for complete search history.

(56) References Cited

FOREIGN PATENT DOCUMENTS

| | | | |
|---|---|---|---|
| JP | 08-141713 | | 6/1996 |
| JP | 08-197214 | | 8/1996 |
| JP | 2001-179408 | | 7/2001 |
| JP | 2006-289383 | | 10/2006 |
| JP | 2007203364 A | * | 8/2007 |
| JP | 2011-147979 | | 8/2011 |
| JP | 2011147979 A | * | 8/2011 |
| JP | 2013066913 A | * | 4/2013 |
| JP | 2014-184463 | | 10/2014 |
| KR | 20040099060 A | * | 11/2004 |

OTHER PUBLICATIONS

JP-2007203364-A machine translation. (Year: 2007).*
T. Watanabe et al., "Stability of Cuspidine . . . Ca0—SiO$_2$—CaF$_2$ System", ISIJ International, vol. 42 (2002), No. 5, pp. 489-497.
M. Hanao et al., "Influence of Mold . . . Steel Slabs", Tetsu-to-Hagane, vol. 93 (2007), No. 5, pp. 362-366.

* cited by examiner

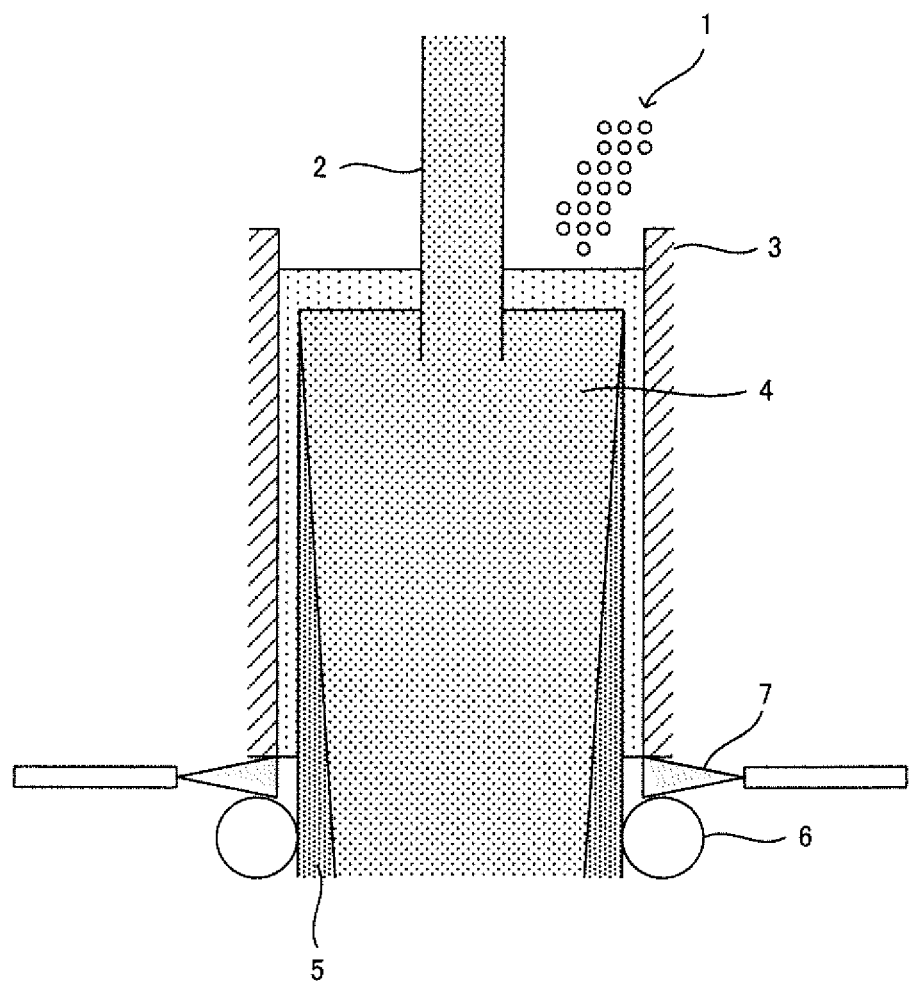

MOLD FLUX FOR CONTINUOUS-CASTING STEEL

TECHNICAL FIELD

This invention relates to mold flux for continuous-casting steel which can prevent longitudinal cracks from forming on a surface of a slab especially when hypo-peritectic steel whose C concentration (carbon concentration. Hereinafter the same will be referred to.) is 0.08 to 0.18 mass % is continuous-east.

BACKGROUND ART

In continuous casting of hypo-peritectic steel whose C concentration is 0.08 to 0.18 mass %, a solidified shell that is formed from solidification of molten steel in a mold tends to be unequal in thickness, which causes longitudinal cracks to easily form on a surface of a slab.

Upon continuous casting, it is effective to mildly cooling an edge portion of a solidified shell (hereinafter referred to as "mild cooling") in order to make the solidified shell in the mold equal in thickness. It is relatively easy therefor to use mold flux.

Mold flux is supplied to the surface of molten steel that is poured into a mold, melts with heat supplied from the molten steel, and flows along the mold, to infiltrate into a gap between the mold and the solidified shell, and to form a film. Just after casting is started, this film is cooled by the mold, to solidify like glass. Crystals are educed from the glass as time passes. If crystallization of this film is promoted, the roughness of the surface of the film in the mold side increases, which causes the interfacial thermal resistance between the mold and the film to increase. In addition, radiative heat transfer in the film is suppressed. Thus, these effects allow the molten steel and the solidified shell that touch the film to be mildly cooled down.

It is cuspidine ($Ca_4Si_2O_7F_2$) that is common composition of crystals educed from the film.

The following methods have been worked out upon promoting crystallization of the film:

First, if fluid physical properties of mold flux are controlled, it is an effective method for promoting crystallization to raise the solidification temperature. Patent Literature 1 discloses that the crystallinity is improved by raising the solidification temperature to the range of 1150 to 1250° C.

Patent Literature 1 describes that if the solidification temperature of the mold flux is raised more than 1250° C., the lubricity between the mold and the solidified shell is disturbed and breakout (the solidified shell breaks and the molten steel is leaked) cannot be prevented.

When chemical components in mold flux are controlled, it is effective to increase the mass concentration ratio of CaO to $SiO_2$ (hereinafter referred to as "basicity"). It is also effective to reduce the MgO concentration.

For example, Patent Literature 2 describes it is effective for crystallization of a film that the basicity is specified by 1.2 to 1.6 and then the MgO concentration is specified by no more than 1.5 mass %. However, since the highest temperature where crystals form in Examples of the mold flux described in Patent Literature 2 is 1145° C., only an effect of mild cooling corresponding to this is obtained.

On the other hand, Patent Literature 3 discloses a method for suppressing radiative heat transfer in a film by adding an iron oxide and/or a transition metal oxide to mold flux.

However, CaO, $SiO_2$ and $CaF_2$ in the mold flux are diluted by the addition of any of these oxides. Specifically, in the invention of Patent Literature 3, no less than 10 mass % of an iron oxide and/or a transition metal oxide in total has to be added as shown in its Examples in order to obtain a sufficient effect of suppressing radiative heat transfer. In this case, cuspidine is difficult to be educed when the basicity of the composition is about 1.0, which is shown in the Examples, and the solidification temperature of the mold flux drops.

The solidification temperature in Examples described in Patent Literature 3 is about 1050° C., which is lower than that of the mold flux for hypo-peritectic steel by no less than 100° C., considering that the solidification temperature of the mold flux for hypo-peritectic steel is about 1150 to 1250° C. as described above. Therefore, as a result, crystallization of the film is blocked. Thus, an effect of mild cooling according to crystallization, that is, increase of interfacial thermal resistance and the like, is marred.

Patent Literature 4, which was formerly proposed by this inventor, discloses a range of the composition of mold flux where cuspidine is easily educed, in the quaternary system of $CaO$—$SiO_2$—$CaF_2$—NaF. This range of the composition is substantially same as a primary crystallization field of cuspidine according to the report thereafter (ISIJ International, 42 (2002), p. 489).

This inventor also proposes, in Patent Literature 5, the method for adding a transition metal oxide to the basic composition prepared within the range of the invention of Patent Literature 4, to drop the solidification temperature without marring an effect of mild cooling.

The invention proposed in Patent Literature 5 is to obtain an effect of mild cooling that mold flux whose solidification temperature is 1250° C. or more has, which has been conventionally considered to be difficult to be used because the lubricity is disturbed, from the solidification temperature of the general range, 1209 to 1239° C. as illustrated in its Examples, for example.

However, in casting of hypo-peritectic steel as well, longitudinal cracks more easily form when the degree of superheat (which means "difference between the temperature of the molten steel and liquidus temperature". Hereinafter the same will be referred to.) of molten steel is high, as the case when a grade of steel containing an alloying element such as Cu, Ni, Cr, Mo, Nb, V, Ti and B.

When the degree of superheat of molten steel is high upon casting hypo-peritectic steel as the above, an effect enough for preventing or suppressing longitudinal cracks might not be obtained even with the inventions of Patent Literatures 4 and 5 proposed by this inventor. That is, a sufficient effect might not be obtained even from mold flux where cuspidine is easy to be educed by adding a transition metal oxide to its composition range, when hypo-peritectic steel containing an alloying element such as Cu, Ni, Cr, Mo, Nb, V, Ti and B is continuous-cast.

CITATION LIST

Patent Literature

Patent Literature 1: JP H8-197214A
Patent Literature 2: JP H8-141713A
Patent Literature 3: JP H7-185755A
Patent Literature 4: JP2001-179408A
Patent Literature 5: JP2006-289383A

SUMMARY OF INVENTION

Technical Problem

An object of this invention is to provide mold flux for continuous-casting steel which can prevent longitudinal cracks from forming on the surface of a slab when hypo-peritectic steel whose C concentration is 0.08 to 0.18 mass % is continuous-cast even if the degree of superheat of molten steel is high as a grade of steel containing an alloying element such as Cu, Ni, Cr, Mo, Nb, V, Ti and B.

Solution to Problem

This invention is Mold flux used for continuous-casting hypo-peritectic steel whose C concentration is 0.08 to 0.18 mass %, wherein
CaO, $SiO_2$, an alkali metal oxide and a fluorine compound are contained,
the following formulas (1), (2) and (3) are satisfied, and a solidification temperature is no less than 1300° C. and viscosity at 1450° C. is no more than 0.1 Pa·s:

$$1.1 \leq f(1) \leq 1.9 \quad (1)$$

$$0.10 \leq f(2) \leq 0.40 \quad (2)$$

$$0 \leq f(3) \leq 0.10 \quad (3)$$

wherein $f(1) = (CaO)_h/(SiO_2)_h$ (a)

$f(2) = (CaF_2)_h/((CaO)_h + (SiO_2)_h + (CaF_2)_h)$ (b)

$f(3) = $ (alkali metal fluoride)$_h/((CaO)_h + (SiO_2)_h + $ (alkali metal fluoride)$_h)$ (c)

$(CaO)_h = (W_{CaO} - (CaF_2)_h \times 0.718)$ (A)

$(SiO_2)_h = W_{SiO2}$ (B)

$(CaF_2)_h = (W_F - W_{Li2O} \times 1.27 - W_{Na2O} \times 0.613 - W_{K2O} \times 0.403) \times 2.05$ (C)

(alkali metal fluoride)$_h = W_{Li2O} \times 1.74 + W_{Na2O} \times 1.35 + W_{K2O} \times 1.23$ (D)

wherein $W_i$ is a mass concentration (mass %) of a component i in the mold flux.

In the above invention, preferably, 0.1-10 mass % of MnO is further contained.

In this invention, the solidification temperature of mold flux is raised to 1300° C. or more, which is the range having been seldom considered conventionally, to promote further crystallization and to obtain an effect of mild cooling. At the same time, the lubricity in a mold is also kept by decreasing the viscosity at 1450° C. enough, to 0.1 Pa·s or less. Whereby, longitudinal cracks can be prevented from forming on the surface of a slab even if hypo-peritectic steel containing an alloying element such as Cu, Ni, Cr, Mo, Nb, V, Ti and B is continuous-cast.

In addition, crystallization of cuspidine is difficult to be blocked by containing 0.1 to 10 mass % of MnO. Thus, longitudinal cracks are easy to be prevented from forming on the surface of a slab even if hypo-peritectic steel containing an alloying element such as Cu, Ni, Cr, Mo, Nb, V, Ti and B is continuous-cast.

Advantageous Effects of Invention

In this invention, further crystallization of a forming film is promoted and an effect of mild cooling is obtained, and at the same time, the lubricity in a mold can be also kept. Thus, longitudinal cracks can be prevented from forming on the surface of a slab even if hypo-peritectic steel containing an alloying element such as Cu, Ni, Cr, Mo, Nb, V, Ti and B is continuous-cast.

BRIEF DESCRIPTION OF DRAWINGS

FIG. 1 is a view showing the mold flux for continuous-casting steel of this invention.

DESCRIPTION OF EMBODIMENTS

In this invention, an object of preventing longitudinal cracks from forming on the surface of a slab when hypo-peritectic steel containing an alloying element such as Cu, Ni, Cr, Mo, Nb, V, Ti and B is continuous-cast is realized by: preparing CaO, $SiO_2$, an alkali metal oxide and a fluorine compound within the optimum range, to keep the composition within the primary crystallization field of cuspidine; and setting the solidification temperature in 1300° C. or more and the viscosity at 1450° C. in 0.1 Pa·s or less. Preferably, the mold flux for continuous-casting steel according to this invention further contains 0.1 to 10 mass % of MnO.

Hereinafter the mold flux for continuous-casting steel of this invention (may be simply referred to as "the mold flux of this invention" below) will be explained. FIG. 1 is a view showing the mold flux for continuous-casting steel of this invention. As shown in FIG. 1, mold flux 1 of this invention is supplied to the surface of molten steel 4 that was poured into a mold 3 via an immersion nozzle 2. The mold flux 1 of this invention supplied in this way melts with heat supplied from the molten steel 4. After that, the mold flux 1 flows along the mold 3, and infiltrates into a gap between the mold 3 and a solidified shell 5, to form a film. The solidified shell 5, which is formed by cooling from the side of the mold 3 that is cooled by cooling means not shown, is withdrawn toward a lower part of the mold 3 with rolls 6, and is cooled by cooling water 7.

Patent Literature 1 formerly explained describes that if the solidification temperature is higher than 1250° C., the lubricity is disturbed and breakout cannot be prevented. While the proper viscosity of the mold flux is specified as 0.6 to 2.5 poises (=0.06 to 0.25 Pa·s) at 1300° C. in the invention of Patent Literature 1, the viscosity in most of Examples illustrated in Patent Literature 1 is no less than 1 poise (=0.1 Pa·s).

It is necessary to lessen the resistance when the solidified shell is withdrawn toward a lower part of the mold (frictional force in the mold) for keeping the lubricity in the mold upon continuous casting. Because the mold flux exists between the inner wall of the mold and the solidified shell, the above frictional force can be lessened by decreasing its viscosity.

There is a problem that when the viscosity of the mold flux is decreased, the mold flux tends to be involved in the molten steel in the mold, and droplets of the involved mold flux becomes non metallic inclusions in the vicinity of the surface of a slab, to make the cleanness deteriorate.

"Tetsu-to-Hagané", Vol. 93 (2006), No. 5, page 362 describes that the involvement can be prevented by keeping the composition of mold flux having the basicity even if the viscosity at 1300° C. is as low as 1 poise (=0.1 Pa's) or less.

The present invention was made about mold flux used for continuous-casting hypo-peritectic steel whose C concentration is 0.08 to 0.18 mass % based on the above approaches.

In this invention, the basic components are CaO, $SiO_2$ and a fluorine compound, which are components of cuspidine. In addition, an alkali metal oxide is added, so that the solidification temperature can be easy to be controlled comparably. Here, "basic components" are the components of cuspidine, which mean that the sum total of the concentrations of CaO, $SiO_2$ and fluorine in a fluorine compound is no less than 60 mass %.

Each concentration of CaO, $SiO_2$, a fluorine compound and an alkali metal oxide is adjusted so as to satisfy the following formulas (1), (2) and (3), which represent the conditions under which cuspidine is easy to be crystallized:

$1.1 \leq f(1) \leq 1.9$ (1)

$0.10 \leq f(2) \leq 0.40$ (2)

$0 \leq f(3) \leq 0.10$ (3)

where $f(1) = (CaO)_h / (SiO_2)_h$ (a)

$f(2) = (CaF_2)_h / ((CaO)_h + (SiO_2)_h + (CaF_2)_h)$ (b)

$f(3) = (\text{alkali metal fluoride})_h / ((CaO)_h + (SiO_2)_h + (\text{alkali metal fluoride})_h)$ (c)

$(CaO)_h = (W_{CaO} - (CaF_2)_h \times 0.718)$ (A)

$(SiO_2)_h = W_{SiO2}$ (B)

$(CaF_2)_h = (W_F - W_{Li2O} \times 1.27 - W_{Na2O} \times 0.613 - W_{K2O} \times 0.403) \times 2.05$ (C)

$(\text{alkali metal fluoride})_h = W_{Li2O} \times 1.74 + W_{Na2O} \times 1.35 + W_{K2O} \times 1.23$ (D)

where $W_i$ is a mass concentration (mass %) of a component i in the mold flux.

The composition of the mold flux can be kept within the primary crystallization field of cuspidine by adjusting each concentration of CaO, $SiO_2$, a fluorine compound and an alkali metal oxide so as to satisfy the conditions represented by the above formulas (1), (2) and (3).

Here, when f(1) does not reach 1.1 or when f(1) is over 1.9, the composition of the mold flux deviates from cuspidine. Thus, crystallization enough for mild cooling cannot be obtained. Therefore, in this invention, f(1) is 1.1 to 1.9. Preferably, f(1) is no less than 1.2 and especially preferably no less than 1.3 because it makes the composition of the mold flux more similar to cuspidine, which brings about the embodiment where effective crystallization is easy to be achieved. Further, in the same point of view, f(1) is preferably no more than 1.8, and especially preferably no more than 1.7. In this invention, the preferable range of f(1) is 1.2 to 1.8, and especially preferably 1.3 to 1.7.

When f(2) does not reach 0.10 or when f(2) is over 0.40, the composition of the mold flux deviates from cuspidine. Thus, crystallization enough for mild cooling cannot be obtained. Therefore, in this invention, f(2) is 0.10 to 0.40. Preferably, f(2) is no less than 0.12 and especially preferably no less than 0.15 because it makes the composition of the mold flux more similar to cuspidine, which brings about the embodiment where effective crystallization is easy to be achieved. Further, in the same point of view, f(2) is preferably no more than 0.35, and especially preferably no more than 0.30. In this invention, the preferable range of f(2) is 0.12 to 0.35, and especially preferably 0.15 to 0.30.

When f(3) does not reach 0 or when f(3) is over 0.10, the composition of the mold flux deviates from cuspidine. Thus, crystallization enough for mild cooling cannot be obtained. Therefore, in this invention, f(3) is 0 to 0.10. Preferably, f(3) is no more than 0.08 because it makes the composition of the mold flux more similar to cuspidine, which brings about the embodiment where effective crystallization is easy to be achieved.

Generally, the viscosity of mold flux at 1300° C. is used as the basis. However, in this invention where the composition is kept within the primary crystallization field of cuspidine whose melting point is 1410 to 1420° C., the mold flux is already solidified at 1300° C. by crystallization, and thus, the value at 1300° C. cannot be obtained. Thus, in this invention, the viscosity at 1450° C. is defined as 0.1 Pa·s or below.

The lubricity can be kept with this viscosity even in the state where the solidification temperature is raised to 1300° C. or more, which has been conventionally said to be difficult. If the solidification temperature rises, an effect of mild cooling in the mold is improved according thereto. In this invention, it is impossible to raise the solidification temperature of the mold flux to or over the above described melting point of cuspidine.

Not a little Mn is added to hypo-peritectic steel to be practically used in order to improve the strength when used as a steel material. Thus, MnO generated by oxidation of Mn in the molten steel migrates to the mold flux during casting. This MnO is a component that blocks crystallization of cuspidine. Thus, in this invention, preferably MnO was mixed in advance by amount corresponding to the MnO concentration which is increased by MnO migrating from the molten steel to the mold flux. According to this inventor's examination, the concentration of the contained MnO is no less than 0.1 mass % in view of achieving an embodiment where an effect by the addition is easily obtained. In addition, the concentration of the contained MnO is no more than 10 mass % in view of preventing such a case from happening that the solidification temperature of the mold flux is too much low not to obtain crystallization, which is necessary for mild cooling. In this invention, it is proper that the MnO concentration in the mold flux is set according to the Mn concentration in the molten steel.

In some cases, MgO, $Al_2O_3$, BaO, $B_2O_3$ and the like may be added in order to control physical properties of the mold flux such as the solidification temperature, the viscosity and the surface tension. However, it is better that their concentrations are low in order to promote crystallization of cuspidine. Their concentrations are desirably not beyond 7 mass % in total. When normal raw materials are used, the total concentration of them that are inevitably contained is about 2 to 5 mass %, and can be no more than 2 to 5 mass % by using artificial raw materials like a pre-melted base material.

EXAMPLES

The results of the experiments done for confirming effects of this invention will be described.

Example 1

Mold flux of this invention of each Example of this invention, Reference Example and Comparative Example shown in Tables 1 and 2 was made. Here, f(1), f(2) and f(3) shown in Table 2 below were indexes calculated from the above formulas (a), (b) and (c). Crystallization of cuspidine in the mold flux was able to be promoted by adjusting these indexes within the ranges of the above formulas (1), (2) and (3). Concerning the components whose mass concentrations (mass %) are not shown in Table 1 and 2, f(1), f(2) and f(3) were calculated assuming that the mass % was zero. It is difficult in a general chemical analysis to evaluate the concentration of no more than 0.1 mass % with high accuracy. Thus, in Tables 1 and 2, "<0.1" is shown if the concentration of a component was less than 0.1 mass %.

TABLE 1

| Category | Type | Concentration of Component (mass %) | | | | | | |
|---|---|---|---|---|---|---|---|---|
| | | SiO$_2$ | CaO | Al$_2$O$_3$ | MgO | Na$_2$O | MnO | F |
| Example of This Invention | A | 30.6 | 55.1 | 4.2 | 0.7 | <0.1 | —* | 9.5 |
| | B | 31.2 | 56.2 | 2.4 | 0.7 | <0.1 | —* | 9.5 |
| | C | 30.1 | 51.2 | 4.0 | 0.6 | 3.5 | —* | 10.5 |
| | D | 30.3 | 54.6 | 2.4 | 0.7 | <0.1 | 2.5 | 9.5 |
| | E | 33.7 | 53.9 | 2.3 | 0.7 | <0.1 | —* | 9.5 |
| | F | 35.7 | 56.3 | 2.1 | 0.6 | <0.1 | —* | 5.3 |
| | G | 34.1 | 54.9 | 2.5 | 1.0 | 1.0 | —* | 6.5 |
| | H | 30.5 | 51.5 | 2.0 | <0.1 | 4.5 | —* | 11.5 |
| | I | 30.6 | 55.1 | 3.2 | 0.7 | <0.1 | 1.0 | 9.5 |
| | J | 33.7 | 53.9 | 2.0 | 0.5 | <0.1 | 0.5 | 9.5 |
| | K | 30.5 | 51.5 | 1.9 | <0.1 | 1.0 | 0.1 | 11.5 |
| Comparative Example | a | 28.8 | 48.9 | 3.3 | 0.5 | 6.0 | 1.5 | 11.0 |
| | b | 27.0 | 48.7 | 3.8 | 0.6 | 8.0 | —* | 12.0 |
| | c | 37.1 | 28.7 | 8.0 | 0.1 | 16.8 | —* | 9.5 |

TABLE 2

| Category | Type | Index of This Invention | | | Solidification Temperature (° C.) | Viscosity (Pa · s) |
|---|---|---|---|---|---|---|
| | | f(1) | f(2) | f(3) | | |
| Example of This Invention | A | 1.34 | 0.21 | 0 | 1311 | 0.07 |
| | B | 1.35 | 0.21 | 0 | 1355 | 0.07 |
| | C | 1.29 | 0.20 | 0.06 | 1302 | 0.05 |
| | D | 1.34 | 0.22 | 0 | 1334 | 0.06 |
| | E | 1.19 | 0.21 | 0 | 1301 | 0.07 |
| | F | 1.36 | 0.11 | 0 | 1329 | 0.08 |
| | G | 1.35 | 0.14 | 0.02 | 1332 | 0.07 |
| | H | 1.27 | 0.21 | 0.08 | 1302 | 0.06 |
| | I | 1.34 | 0.21 | 0 | 1306 | 0.06 |
| | J | 1.19 | 0.21 | 0 | 1303 | 0.06 |
| | K | 1.27 | 0.21 | 0.08 | 1301 | 0.07 |
| Comparative Example | a | 1.33 | 0.18 | 0.11* | 1255* | 0.04 |
| | b | 1.41 | 0.18 | 0.14* | 1236* | 0.03 |
| | c | 0.8* | 0* | 0.25* | 1060* | 0.12* |

All the compositions of the mold flux of Examples of this invention A to K satisfied the above formulas (1) to (3). Their solidification temperatures were no less than 1300° C., and the viscosities at 1450° C. were no more than 0.1 Pa·s. In contrast, concerning the compositions of the mold flux of Comparative Examples a to c, the compositions of this mold flux did not satisfy any of the above formulas (1) to (3). As a result, at least one of the solidification temperature and the viscosity at 1450° C. of each thereof was out of the range of this invention. Values with marks of asterisks in Tables 1 and 2 represent being out of the range of this invention.

The mold flux of each Example of this invention A to K and Comparative Example a to c was used for continuous casting of hypo-peritectic steel having the composition shown in Table 3 below, containing Nb and Ti, and whose degree of superheat in a state of molten steel is high, and the results were compared. Here, a slab of 500 mm in width and 85 mm in thickness was produced with a vertical bending type continuous casting machine, using 2.5 tons of the molten steel, under the conditions where the casting speed was 1.0 m/min and the specific water flow of the secondary cooling water was 1.1 litter/kg.

TABLE 3

| Concentration of Component (mass %) | | | | | | | | |
|---|---|---|---|---|---|---|---|---|
| C | Si | Mn | P | S | Nb | Ti | Al | Remainder |
| 0.09 | 0.15 | 1.40 | 0.010 | 0.005 | 0.0014 | 0.010 | 0.03 | Fe and Impurities |

The mold flux added to the inside of the mold was selectively used, and as to an effect of mild cooling, a solidification coefficient was obtained by calculating local heat flux in the mold, the surface temperature of the slab and the thickness of the solidified shell and its growth rate, to compare the obtained results. As to the lubricity, the frictional force in the mold was obtained, to compare the obtained results. The results are shown in Table 4.

The local heat flux in the mold was obtained from temperature measured with a thermocouple that was embedded at the center of the width of the longer side surface 35 mm under the meniscus, to be evaluated. The frictional force in the mold was obtained from difference in pressure of a hydraulic cylinder used for oscillation of the mold. The surface temperature of the slab was measured at the center of the width in the side of the inward curve of roll segments just before the curving point of the vertical bending type continuous casting machine. The thickness of the solidified shell and its growth rate were evaluated by such a method that: a FeS alloy was added to the molten steel in the mold at the time point just before the casting was ended, a portion of the slab where the alloy was added was cut in the casting direction, and the concentration distribution of S on the cut surface was transferred to photographic paper.

TABLE 4

| Category | Type | Local Heat Flux in Mold (MW/m$^2$) | Frictional Force in Mold (N/mm$^2$) | Surface Temperature of Slab (Center of Width in Side of Inward Curve) (° C.) | Solidification Coefficient (mm/min$^{0.5}$) | Length and Number of Longitudinal Cracks |
|---|---|---|---|---|---|---|
| Example of This Invention | A | 1.32 | $1.12 \times 10^{-2}$ | 1150 | 11.2 | None |
| | B | 1.26 | $2.09 \times 10^{-2}$ | 1140 | 12.3 | None |
| | C | 1.41 | $1.14 \times 10^{-2}$ | 1110 | 13.4 | None |
| | D | 1.29 | $1.19 \times 10^{-2}$ | 1120 | 11.9 | None |
| | E | 1.42 | $1.13 \times 10^{-2}$ | 1105 | 13.8 | None |
| | F | 1.39 | $1.53 \times 10^{-2}$ | 1109 | 13.5 | None |
| | G | 1.34 | $1.47 \times 10^{-2}$ | 1118 | 12.9 | None |
| | H | 1.41 | $1.06 \times 10^{-2}$ | 1107 | 13.1 | None |
| | I | 1.34 | $1.10 \times 10^{-2}$ | 1150 | 11.3 | None |
| | J | 1.44 | $1.09 \times 10^{-2}$ | 1100 | 14.0 | None |
| | K | 1.42 | $1.04 \times 10^{-2}$ | 1105 | 13.2 | None |

TABLE 4-continued

| Category | Type | Local Heat Flux in Mold (MW/m²) | Frictional Force in Mold (N/mm²) | Surface Temperature of Slab (Center of Width in Side of Inward Curve) (° C.) | Solidification Coefficient (mm/min$^{0.5}$) | Length and Number of Longitudinal Cracks |
|---|---|---|---|---|---|---|
| Comparative Example | a | 1.48 | 1.26 × 10$^{-2}$ | 1100 | 18.1 | None |
|  | b | 1.71 | 1.04 × 10$^{-2}$ | 1020 | 20.6 | None |
|  | c | 1.93 | 0.87 × 10$^{-2}$ | 950 | 24.8 | 100 mm × 2 cracks |

From the results of the evaluation of the local heat flux in the mold, while the local heat flux was no less than 1.48 MW/m² in every Comparative Example, it decreased to no more than 1.44 MW/m² in every Example of this invention, from which an effect of mild cooling was confirmed.

The frictional force in the mold was no more than 2.09×10$^{-2}$ (N/mm²) in every Example of this invention and Comparative Example. Thus, no problems occur to the lubricity, and normal oscillation marks were formed on the surface of the slab at regular intervals.

The results of the measurement of the surface temperature of the slab were as follows: the temperature in cases where the mold flux of Examples of this invention was used was equal to or higher than that in cases where the mold flux of Comparative Examples was used, from which an effect of mild cooling was confirmed.

From the results of the evaluation of the thickness of the solidified shell and its growth rate, while the solidification coefficient was 18.1 to 24.8 mm/min$^{0.5}$ in every Comparative Example, it decreased to 11.2 to 14.0 mm/min$^{0.5}$ in every Example of this invention, from which an effect of mild cooling was clearly confirmed on the growth of the solidified shell.

In every Example of this invention, the obtained slab had excellent surface properties and condition. No surface defects such as longitudinal cracks or depressions appeared. In contrast, in Comparative Example c, two longitudinal cracks of about 100 mm in length appeared at the center of the width.

Example 2

The mold flux of each Example of this invention A and Comparative Example a was used out of the mold flux tested in Example 1, and larger-scale continuous casting than Example 1 was carried out.

The molten steel of 300 tons, having the composition shown in Table 5, was supplied for casting using the mold flux of each Example, to cast twelve slabs of about 2300 mm in width, 300 mm in thickness and 6 m in length at the speed of 0.70 m/min. The results of the surfaces of the obtained slabs were as follows:

TABLE 5

| Concentration of Component (mass %) | | | | | | | | |
|---|---|---|---|---|---|---|---|---|
| C | Si | Mn | P | S | Cr | Mo | Al | Remainder |
| 0.11 | 0.30 | 0.90 | <0.025 | <0.005 | 0.50 | 0.40 | 0.02 | Fe and Impurities |

From Example of this invention A, twelve slabs of excellent surfaces without any longitudinal cracks were obtained. These slabs were able to be supplied for a rolling process as they were.

In contrast, in Comparative Example a, longitudinal cracks formed on the surface of fours slabs, that is, the first, second, eleventh and twelfth slabs after casting was started. All the slabs where longitudinal clacks formed were necessary to be repaired (scarfing with a scarfer).

It is needless to say that this invention is not limited to the above described examples, and the embodiments may be properly modified if such modification is within the scope of the technical concepts recited in the claims.

REFERENCE SIGNS LIST

1 . . . mold flux for continuous-casting steel
2 . . . immersion nozzle
3 . . . mold
4 . . . molten steel
5 . . . solidified shell
6 . . . rolls
7 . . . cooling water

The invention claimed is:

1. Mold flux used for continuous-casting hypo-peritectic steel whose C concentration is 0.08 to 0.18 mass %, wherein CaO, SiO$_2$, an alkali metal oxide and a fluorine compound are contained,
the following formulas (1), (2) and (3) are satisfied, and a solidification temperature is no less than 1300° C. and viscosity at 1450° C. is no more than 0.1 Pa·s:

$$1.1 \leq f(1) \leq 1.9 \quad (1)$$

$$0.10 \leq f(2) \leq 0.40 \quad (2)$$

$$0 \leq f(3) \leq 0.10 \quad (3)$$

wherein $f(1) = (CaO)_h/(SiO_2)_h$ \quad (a)

$$f(2) = (CaF_2)_h/((CaO)_h + (SiO_2)_h + (CaF_2)_h) \quad (b)$$

$$f(3) = (\text{alkali metal fluoride})_h/((CaO)_h + (SiO_2)_h + (\text{alkali metal fluoride})_h) \quad (c)$$

$$(CaO)_h = (W_{CaO} - (CaF_2)_h \times 0.718) \quad (A)$$

$$(SiO_2)_h = W_{SiO2} \quad (B)$$

$$(CaF_2)_h = (W_F - W_{Li2O} \times 1.27 - W_{Na2O} \times 0.613 - W_{K2O} \times 0.403) \times 2.05 \quad (C)$$

$$(\text{alkali metal fluoride})_h = W_{Li2O} \times 1.74 + W_{Na2O} \times 1.35 + W_{K2O} \times 1.23 \quad (D)$$

wherein $W_i$ is a mass concentration of a component i in the mold flux and $(CaO)_h$, $(SiO_2)_h$, $(CaF_2)_h$, and (alkali metal fluoride)$_h$ represent values based on results from calculations from the right side of equations (A), (C), and (D), and the right side of equality (B).

2. The mold flux for continuous-casting hypo-peritectic steel according to claim 1, wherein the mold flux further contains 0.1-10 mass % of MnO.

\* \* \* \* \*